United States Patent [19]
Diefenthaler et al.

[11] Patent Number: 5,873,163
[45] Date of Patent: Feb. 23, 1999

[54] METHOD FOR REPAIRING CORRODED CYLINDER CASTINGS IN WATER-COOLED ENGINE BLOCKS

[76] Inventors: Mark S. Diefenthaler, 4311 13th Ave. SW, Naples, Fla. 34116; Robert E. Diefenthaler, Jr., 481 Quail Forest Blvd., #105, Naples, Fla. 34105

[21] Appl. No.: 954,197

[22] Filed: Oct. 20, 1997

Related U.S. Application Data

[60] Provisional application No. 60/029,569 Oct. 22, 1996.

[51] Int. Cl.⁶ ....................................................... B23P 15/00
[52] U.S. Cl. ................................... 29/888.06; 29/888.011
[58] Field of Search ....................... 29/888.011, 888.061, 29/888.06, 402.08

[56] References Cited

U.S. PATENT DOCUMENTS

| | | |
|---|---|---|
| 2,912,562 | 11/1959 | Donovan . |
| 3,593,406 | 7/1971 | Jones, Jr. . |
| 3,685,132 | 8/1972 | Hodge . |
| 4,153,983 | 5/1979 | Stockton . |
| 5,617,773 | 4/1997 | Craft et al. .......................... 29/888.061 |
| 5,666,725 | 9/1997 | Ward ................................... 29/888.011 |
| 5,755,028 | 5/1998 | Takami et al. ........................ 29/888.06 |

*Primary Examiner*—Irene Cuda
*Attorney, Agent, or Firm*—William E. Noonan

[57] ABSTRACT

A method for repairing the cylinder block of an internal combustion engine. The cylinder block engages a standard cylinder head and includes an outer cylinder casting that surrounds an inner cylinder sleeve. The casting has corrosion formed in an end surface that faces the cylinder head. The method includes the steps of providing a repair ring that is separate and distinct from the cylinder sleeve and has a selected thickness. A counterbore is formed in the end surface of the cylinder casting to remove the corrosion therefrom. The counterbore has a depth that is no greater than the thickness of the ring. The ring is installed annularly about and in close tolerance fit with the cylinder sleeve and is introduced into the counterbore. At least one of the cylinder sleeve and the ring are machined for form thereon respective, generally co-planar surfaces that face the cylinder head.

9 Claims, 6 Drawing Sheets

METHOD FOR REPAIRING CORRODED CYLINDER CASTINGS IN WATER-COOLED ENGINE BLOCKS

RELATED APPLICATION

This application is a continuation in part of U.S. provisional patent application Ser. No. 60/029,569 filed Oct. 22, 1996.

FIELD OF INVENTION

This invention relates to a method and apparatus for repairing a corroded cylinder casting in a water-cooled internal combustion engine. The method and apparatus are particularly useful for repairing corroded cylinder castings of the type used in the marine industry.

BACKGROUND OF THE INVENTION

Outboard marine engines tend to exhibit rapid and often premature deterioration due to water corrosion. Most engine blocks employ aluminum cylinder castings, which are surrounded and otherwise bounded by a water jacket. These castings are highly susceptible to corrosion, particularly when the engine is used in a saltwater environment where electrolysis is likely to occur. Such corrosion is accelerated if the boat owner neglects to flush the engine after each use.

Progressive corrosion of the engine block often leads to total failure of the engine. The cylinder castings and the cylinder head are sealably interengaged by a conventional head gasket. Excessive pitting and corrosion of the castings will eventually cause the head gasket to fail. As a result, cooling water from the water jacket leaks into one or more of the combustion chambers and the engine malfunctions.

Traditionally, corroded engine blocks have been discarded and replaced. This is expensive and highly inefficient. The only known technique that attempts to repair the engine block involves the replacement of the cast iron cylinder sleeve. This sleeve, which is surrounded by the casting, is removed and replaced by an entirely new sleeve having a circumferential flange. This procedure is almost as expensive and inefficient as replacing the entire engine block. Considerable time, expense and complexity are required to manufacture these special replacement sleeves.

SUMMARY OF THE INVENTION

It is therefore an object of this invention to provide an improved method and apparatus for repairing corroded engine blocks of the type used in water-cooled internal combustion engines.

It is a further object of this invention to provide a method and apparatus that permits a corroded engine block to be salvaged and reused so that considerable expense is saved.

It is a further object of this invention to provide a method and apparatus that permits corroded engine blocks to be repaired quickly, conveniently and fairly inexpensively.

It is a further object of this invention to provide a method and apparatus that permits corroded engine block castings to be repaired much more efficiently and less expensively than has been possible using techniques of the prior art.

It is a further object of this invention to provide a method and apparatus for effectively repairing water-cooled engine blocks so that leakage between the water jacket and the combustion chamber is prevented.

It is a further object of this invention to provide a method and apparatus that is particularly effective for repairing engine blocks of the type used in the marine industry.

This invention features a method and apparatus for repairing the cylinder block of a water-cooled internal combustion engine. The cylinder block engages a standard cylinder head and includes an outer cylinder casting that surrounds an inner cylinder sleeve. The casting has corrosion formed in an end surface that faces the cylinder head. Both the method and apparatus utilize a repair ring that is separate and distinct from the cylindrical sleeve and that has a selected thickness. A counterbore is formed in the end surface of the cylinder casting to remove the corrosion therefrom. The counterbore has a depth that is no greater than the thickness of the ring. The ring is installed annularly about and in close tolerance fit with the cylinder sleeve and is introduced into the counterbore. At least one of the cylinder sleeve and ring is machined to form thereon respective, generally co-planar surfaces that face the cylinder head.

In a preferred embodiment, an annular chamfer is formed in the ring. The chamfer interconnects a bottom surface and an inner diameter surface of the ring and defines an annular pocket when the ring is introduced into the counterbore. A locking substance may be applied to at least one of the chamfer, the sleeve and the casting such that the locking substance is contained in the pocket and locks the ring within the counterbore and about the sleeve.

The ring typically has an inner diameter that is initially less than the outer diameter of the sleeve. The ring is heated and expanded sufficiently such that it fits about the sleeve and into the counterbore. The ring is then allowed to cool and shrink such that it engages the inner sleeve in an interference fit. Preferably, both the ring and the sleeve are machined. The ring may be cooled and shrunk into an interference fit with the sleeve prior to the machining step. The ring may be provided with a selected thickness that is at least as great as the depth of the corrosion in the end surface of the cylinder casting. The counterbore may have a depth that is approximately 0.01" less than the thickness of the ring.

This invention relates to both a method for performing repairs to the engine block and an apparatus featuring the repaired block. It also relates specifically to the unique repair ring that is disclosed herein.

DETAILED DESCRIPTION OF PREFERRED EMBODIMENTS

Other objects, features and advantages will occur from the following description of preferred embodiments and the accompanying drawings, in which.

Figure 4:
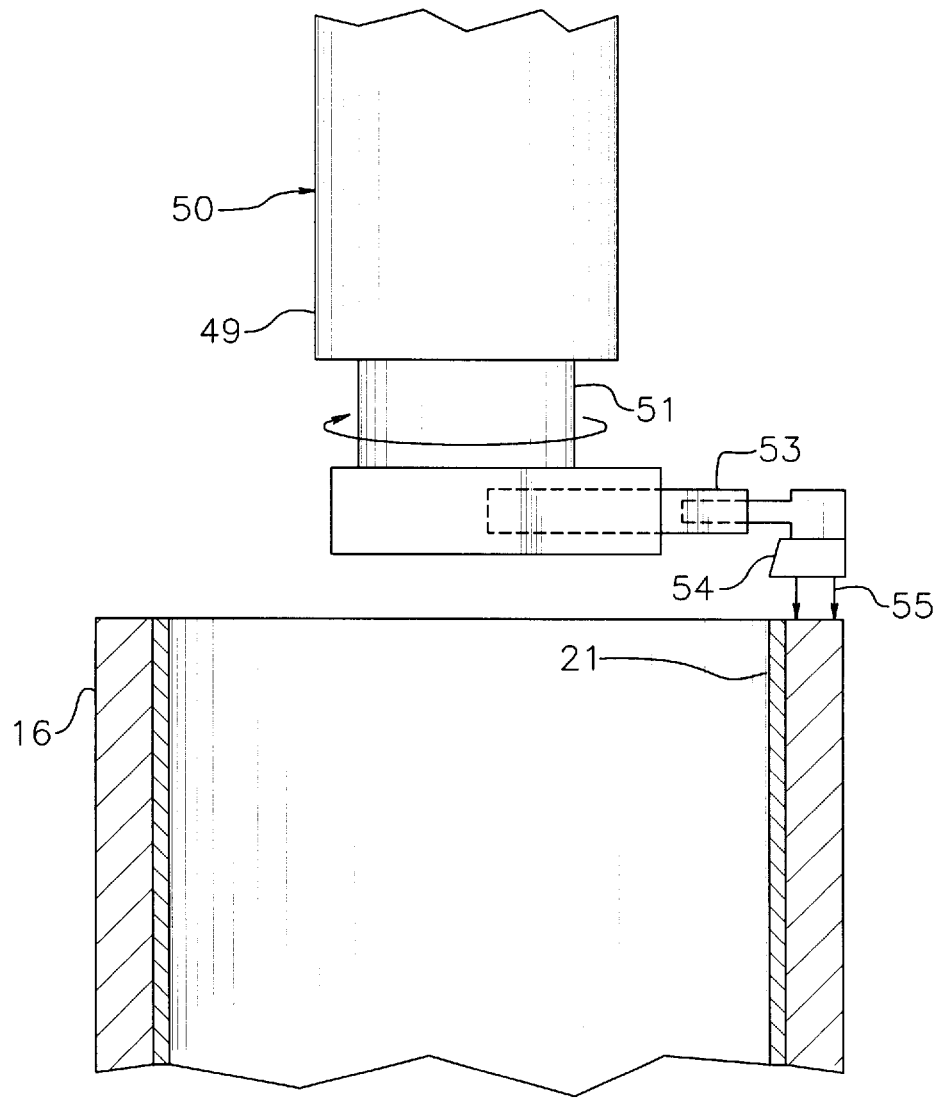
FIG. 4 is an elevational side view, partly cut away and partly schematic, illustrating the two cylinder engine block with a counterbore already formed in the right-hand cylinder casting and a cutting or boring tool being used to form a similar counterbore in the left-hand cylinder casting.
Figure 6:
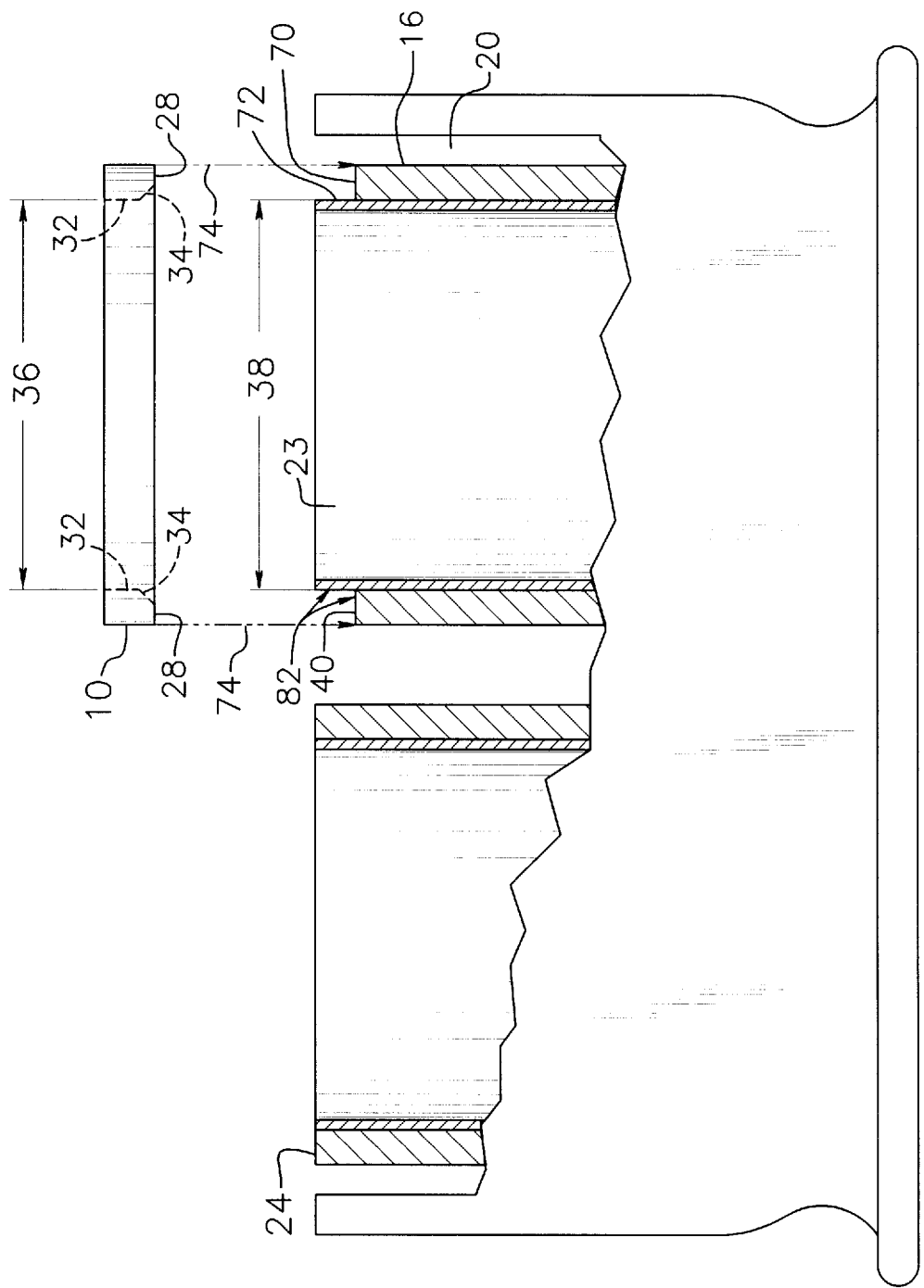
Figure 7:
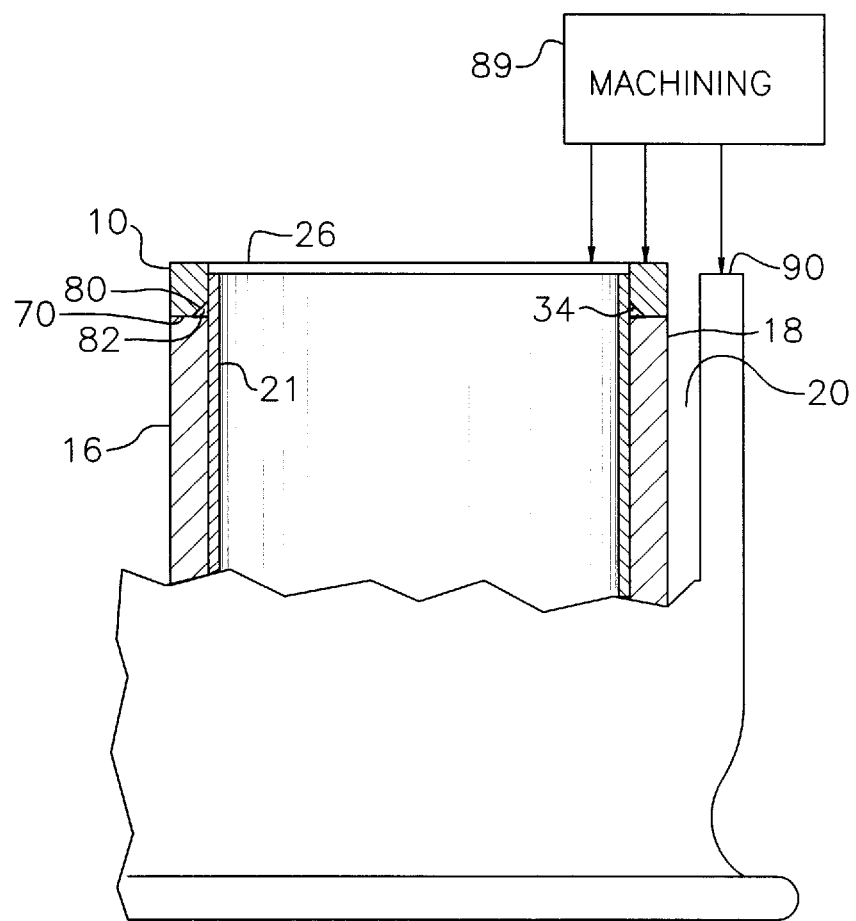

FIG. 6 is an elevational, partly cut away view similar to FIG. 4, wherein the repair ring is positioned over the right-hand cylinder just before it is installed; and FIG. 7 is an elevational, partly cut away and partly schematic view of the engine block after the repair ring has been installed about the right-hand cylinder and with the ring adhesively locked onto both the sleeve and the cylinder casting; machining or resurfacing of the upper end of the block and repair ring is also depicted.

Figure 1:
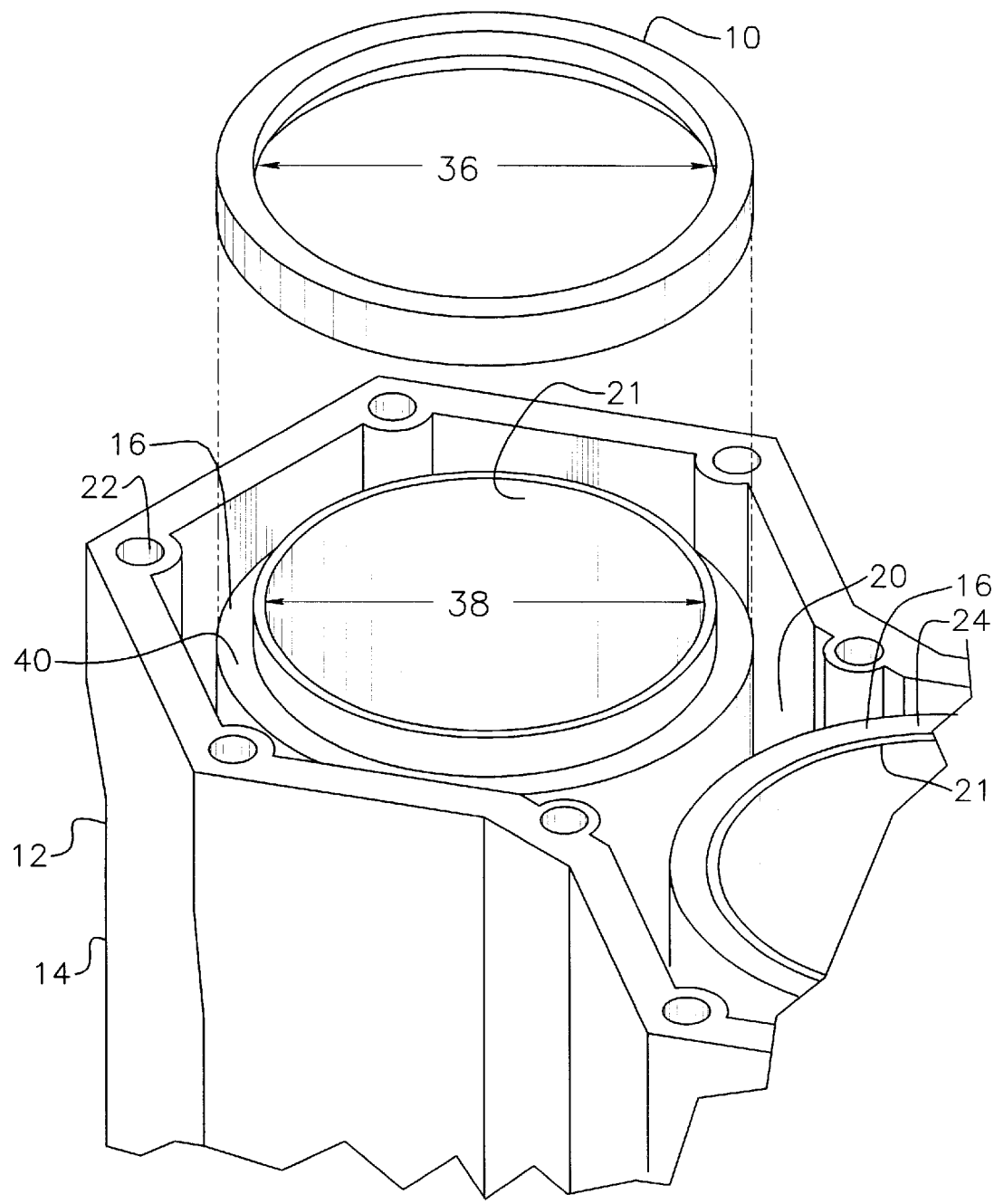
FIG. 1 is a perspective, partially exploded view of an engine block, which is being repaired according to the method and apparatus of this invention.
Figure 2:
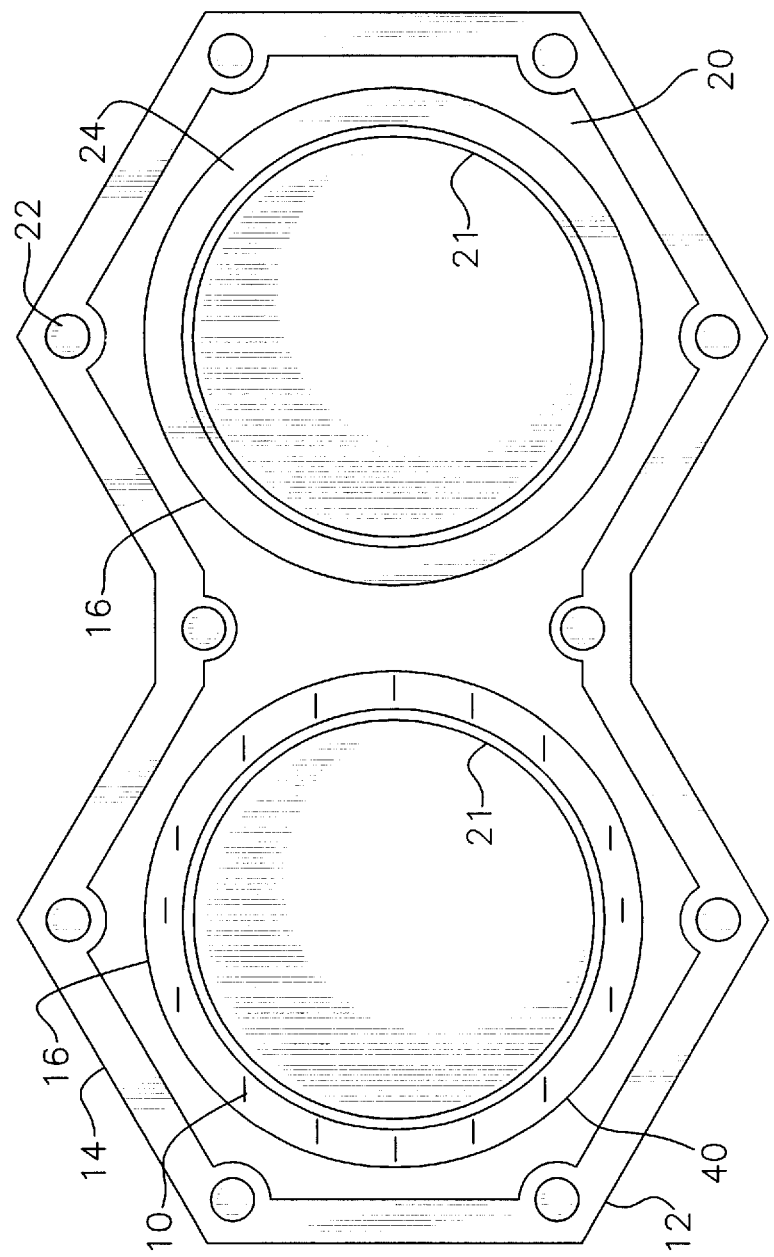
FIG. 2 is a top plan view of a two cylinder engine block; one of the cylinder castings has been repaired utilizing the method and system of this invention.

There is shown in FIG. 1 an annular repair ring 10 that is utilized to repair and salvage a corroded engine block 12. Engine block 12 may be found in various types of water-cooled, internal combustion engines. This invention is particularly beneficial for use on outboard engine blocks of the type used in the marine industry, However, it is not limited to such applications and may also be employed for repairing a wide variety of engine blocks outside of the marine industry. As illustrated in FIGS. 1 and 2, the engine block features a fairly conventional structure. A two cylinder engine (or, analogously, one bank of a V-4 engine block) is depicted. It should be understood, however, that this invention may be practiced on blocks featuring any number of cylinders. Block 12 normally features a cast aluminum construction and includes a peripheral casing 14 and a pair of outer cylinder castings 16. The two combustion chambers of the engine are defined by respective inner cylinder sleeves 21, which are surrounded by respective cylinder castings 16. The inner cylinder sleeves are typically composed of cast iron and have substantially identical shapes and dimensions. A water jacket 20, which has a depth of approximately 2", separates castings 16 from peripheral casing 14 and from one another. During normal operation of the engine, water is circulated through jacket 20 in a known manner to cool the engine block. Likewise, during engine operation, block 12 is engaged with and attached to a standard cylinder head, not shown. Specifically, a conventional head gasket interengages the cylinder head and the cylinder block. Engine bolts, not shown, are interengaged with holes in the cylinder head and aligned holes 22 in engine block casing 14.

The embodiments shown herein depict conventional open deck engine blocks wherein the water jacket is exposed when the cylinder head is removed. It should be understood, however, that this invention is also effective for use in closed deck blocks. Such products employ a deck approximately ¼" thick that unitarily interconnects the cylinder castings and engine casing, and covers the water jacket. Essentially this deck is an integral part of the cylinder castings.

As the engine ages, corrosion tends to form on the upper end surface 24 of one or more of the cylinder castings. In FIGS. 1 and 2, this upper end surface is shown only for the right-hand casting 16. The corroded upper surface of the left-hand casting has already been removed in these figures, in the manner described below. As a result of the corrosion in a particular casting, water can leak from cooling jacket 20 into the combustion chambers surrounded by that casting. This can cause engine failure.

Each corroded casting is repaired by utilizing a respective repair ring 10, to effectively replace the corroded upper end surface of the cylinder casting. Repair ring 10, shown alone in FIG. 3, may be cut on a lathe from industrial tubing. Preferably, the repair ring is composed of aluminum but may alternatively comprise various other metals and metal alloys such as, but not limited to, stainless steel and cast iron. Ring 10 includes a generally flat upper surface 26 and a generally flat lower surface 28. The ring also includes an outer annular surface 30 which interconnects surfaces 26 and 28, and an inner annular surface 32 that depends from surface 26. An annular chamfered surface 34 interconnects lower surface 28 and inner diameter surface 32. Preferably, ring 10 has a thickness T of approximately 0.25". This thickness should be at least as great as the depth to which corrosion extends in a respective upper end surface 24. Various selected ring thicknesses may be utilized. As shown in FIG. 1, the inner diameter 36 of ring 10 is slightly smaller (e.g. 0.007") than the outer diameter 38 of sleeves 21 and 23. The annular dimensions of ring 10 vary based upon the specifications of engine block 12. Ring 10 may utilize assorted dimensions in accordance with this invention so that varying sizes and brands of engine blocks may be repaired. Dimensions may also be selected to accommodate the amount of core shift in the particular engine block being repaired.

Figure 3:
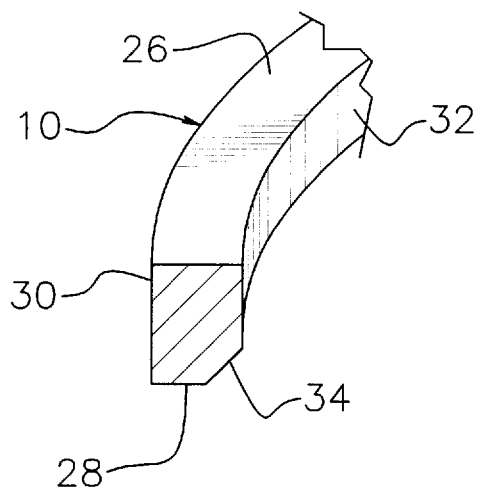
FIG. 3 is a perspective, cross sectional view of a relatively small segment of the annular repair ring.

To repair a corroded cylinder casting an annular counterbore is formed in that casting to remove the corroded end surface 24. In FIGS. 1 and 2, a counterbore 40 is formed in left-hand cylinder casting 16. This counterbore surrounds inner sleeve 21 and includes a depth that is approximately 0.010" less than the thickness T of ring 10. In FIG. 3, an analogous counterbore 40 formed in right-hand cylinder casting 16.

Counterbore 40 is cut in cylinder casting 16 by means of an appropriate boring tool. For example, the counterbore may be formed by an automotive type boring machine utilizing a tool bit that is capable of boring cast aluminum. A representative boring machine 50 is depicted in FIG. 4. Therein, machine 50 is positioned to form a counterbore in one of the cylinder castings. Typically, the engine block is securely mounted on either a table or a lift mechanism. Boring machine 50 may be lowered toward block 12 or, alternatively, the engine may be raised into position adjacent machine 50. The boring machine includes a rotating spindle 51 that extends from a housing 49. Spindle 51 carries an appropriate tool holder 53. A cutting blade 54 is mounted to a tool holder 53 in a conventional manner. Machine 50 drives tool holder 53 rotatably as cutting blade 54 is engaged against casting 16 in the manner indicated by arrows 55. As a result, tool bit 54 cuts into the upper end surface 24 of cylinder casting 16. The corroded portion of the cylinder casting is thereby removed and the counterbore 40 shown in FIGS. 1 and 6, is formed. The counterbore is cut into a depth of approximately 0.25", although this may be varied within the scope of this invention. It should be noted that an analogous counterbore may be formed in each casting in a similar manner. Various alternative types of boring machines and known tools may be employed for cutting the counterbore. The precise process and apparatus are not limitations of this invention.

In all cases, counterbore 40 should be but to a depth that is greater than the depth of the corrosion in the cylinder casting. This depth may be varied in accordance with this invention and as required by the condition of the engine block. For subsequent machining and resurfacing purposes, the depth of the counterbore is usually slightly less (e.g. 0.01") than the thickness T of ring 10. Alternatively, the depth of the counterbore may be approximately equal to the ring thickness T or otherwise slightly less than the ring thickness. To facilitate machining, it is important that the counterbore depth not be greater than the thickness T of ring 10. It should be noted that in closed deck versions, the counterbore is formed essentially in the upper deck surfaces of the casting.

Figure 5:
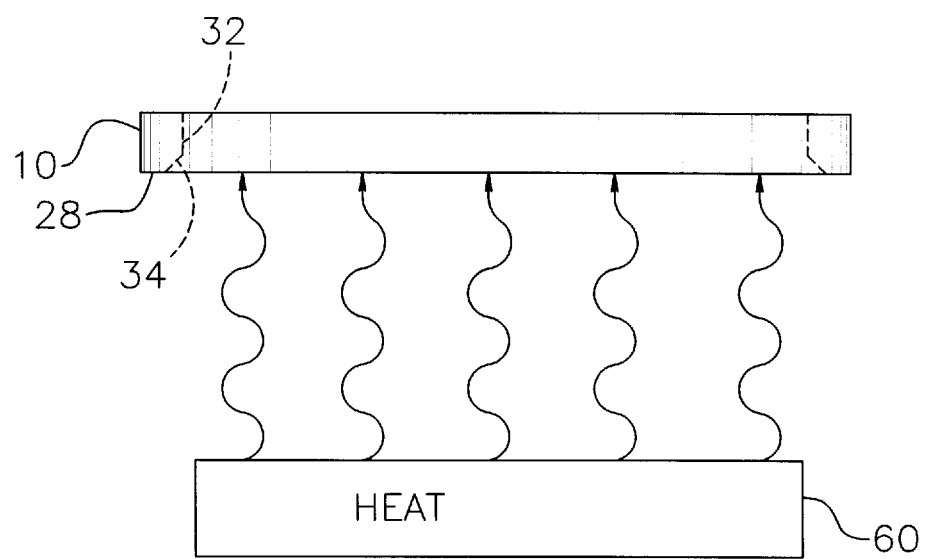
FIG. 5 is a schematic view of the repair ring being heated so that it will expand to fit onto a respective cylinder sleeve.

After counterbore 40 is cut in casting 16, a respective ring 10 is prepared for mounting on that cylinder casting. As shown in FIG. 5, ring 10 is heated by appropriate means 60, which may comprise an oven or kiln. The ring is heated to a temperature that expands the ring so that it will fit annularly about a respective one of the sleeves 21 and into a respective counterbore 40. The appropriate temperature may be determined by referring to a general machinist's handbook.

After ring 10 has been heated and expanded, it is installed onto cylinder casting 16 and about respective cylinder sleeve 21. In FIG. 1, ring 10 is positioned for installation onto left-hand casting 16 and sleeve 21. In FIG. 6, a ring 10 is positioned above right-hand casting sleeve. As further shown with reference to FIG. 6, before the ring is engaged with its respective cylinder casting and sleeve, an adhesive locking substance 82 is applied to the upper surface 70 of casting 16 and the peripheral outer surface 72 of inner sleeve 21. This locking substance preferably comprises an anaerobic locking compound. Ring 10 is then installed into counterbore 40 and about cylinder sleeve 21. Specifically, as shown in FIGS. 6 and 7, the ring's inside diameter 36 is expanded so that it is slightly greater than the outside diameter 38 of sleeve 21. Ring 10 is lowered in the direction of arrows 74, FIG. 6 and installed by hand such that it annularly surrounds sleeve 21. Chamfered surface 34 enables ring 10 to slide onto sleeve 21 without galling or sticking. The ring slides relatively easily along the sleeve and is introduced into counterbore 40. Lower ring surface 28 engages the counterbored upper surface 70 of casting 16. Inner diameter surface 32 of ring 10 engages the peripheral outer surface 72 of sleeve 21. As best illustrated in FIG. 7, chamfer 34 forms an annular void or pocket 80 about sleeve 21. This pocket accommodates the adhesive locking substance 82 that was previously applied to the cylinder casting and/or sleeve. If necessary, ring 10 may be lightly seated against the upper surface 70 of counterbored casting 16 by striking the upper surface 26 of ring 10 with a brass mallet or analogous tool.

After ring 10 is fit onto sleeve 21 and introduced into counterbore 40, it is allowed to cool. As a result, the ring interengages sleeve 21 in an interference fit. This fit, combined with the action of locking substance 82, securely locks ring 10 onto casting 16 and sleeve 21. As a result, the previously corroded upper end surface of casting 16 is replaced by a new, non-corroded ring, which effectively forms the upper end surface of the casting.

As best shown in FIG. 7, after ring 10 is installed, upper surface 26 of ring 10 extends slightly (e.g. 0.01") above the upper end of cylinder sleeve 21. Accordingly, the engine block is resurfaced or machined in a conventional manner, indicated by step 89. This is accomplished by using any one of a variety of resurfacing machines, which are available and known to those skilled in the art. Upper ring surface 26 and upper deck surface 90 of block 12 are machined in a single process so that they are substantially coplanar and meet the engine manufacture's designated surface smoothness and specifications. When this step is completed, the upper surface of the engine block may be re-engaged with the cylinder head through a suitable head gasket. Surface corrosion is eliminated, leaking from the water jacket into the combustion chamber is prevented and engine life is significantly prolonged.

It should be understood that the technique illustrated in FIGS. 6 and 7 analogously applies to repair of the left-hand casting 16 in FIGS. 1, 2 and 4. Indeed, in FIG. 2, a repair ring 10 is shown installed about the left-hand cylinder sleeve 21.

The system and method of this invention permit the engine block to be repaired quickly, conveniently and fairly inexpensively. Unlike prior techniques, the inner cylinder sleeve does not have to be removed and replaced. Rather, only the corroded portion of the cylinder casting is removed. The repair ring replaces the corroded portion of the cylinder casting and forms a reliable, leak resistant surface for sealably engaging the cylinder head and the head gasket. This system and technique economically and efficiently extend the life of water-cooled engine blocks and provide significant benefits for owners of outboard motors and other types of water-cooled internal combustion engines.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A method for repairing the cylinder block of a water-cooled internal combustion engine, which cylinder block engages a standard cylinder head and includes an outer cylinder casting that surrounds an inner cylinder sleeve, the casting having corrosion formed in an end surface that faces said cylinder head, said method comprising the steps of:

providing a repair ring that is separate and distinct from said cylindrical sleeve and that has a selected thickness;

forming a counterbore in the end surface of said cylinder casting to remove the corrosion therefrom, said counterbore having a depth that is no greater than the thickness of said ring;

installing said ring annularly about and in close tolerance fit with said cylinder sleeve; and introducing said ring into said counterbore.

2. The method of claim 1 further including the step of forming an annular chamfer in said ring, which chamfer interconnects a bottom surface and an inner diameter surface of said ring and defines an annular pocket when said ring is introduced into said counterbore.

3. The method of claim 2 further including the step of applying a locking substance to at least one of said chamfer, said sleeve and said casting such that said locking substance is contained in said pocket, and locks said ring within said counterbore and about said sleeve.

4. The method of claim 1 further including the steps of providing a ring having an inner diameter that is less than the outer diameter of said sleeve, heating said ring sufficiently to expand said ring such that it fits about said sleeve into said counterbore and allowing said ring to cool such that it shrinks and engages said sleeve in an interference fit.

5. The method of claim 1 further including the step of providing said ring with a selected thickness that is at least as great as the depth of the corrosion in the end surface of the cylinder casting.

6. The method of claim 1 in wherein both the ring and the sleeve are machined.

7. The method of claim 1 wherein said counterbore is formed to a depth approximately 0.01" less than the thickness of said ring.

8. The method of claim 4 in which said ring is cooled before said machining step.

9. The method of claim 1 further including the step of machining at least one of said cylinder sleeve and said ring to form thereon respective, generally coplanar surfaces that face said cylinder head.

* * * * *